April 14, 1953 R. D. FAGEOL 2,634,709
PRESSURE ACTUATED TRANSMISSION CONTROL UNIT
Filed Feb. 2, 1949 2 SHEETS—SHEET 1

INVENTOR.
ROBLEY D. FAGEOL
BY
E. J. Balluff
ATTORNEY

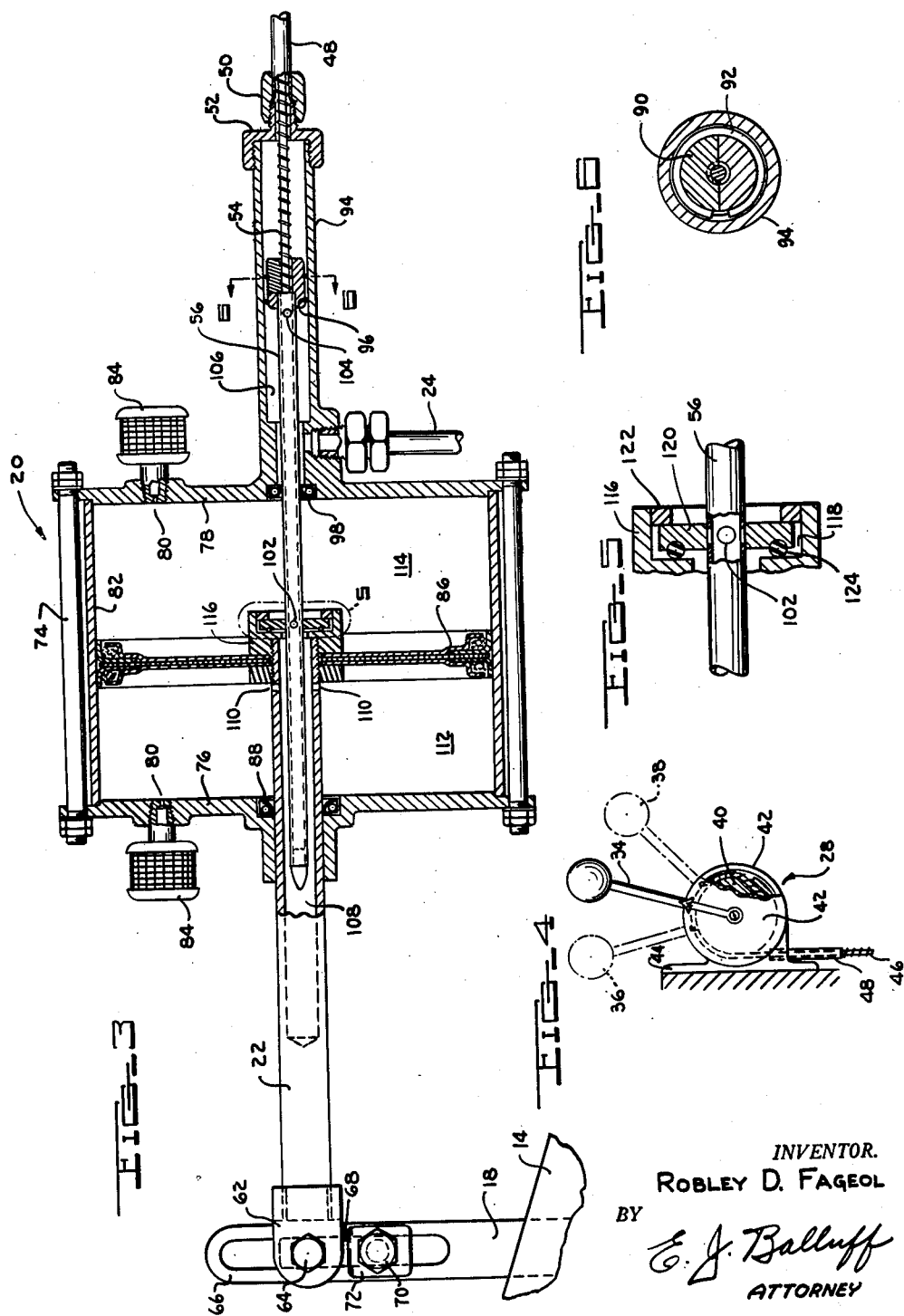

Patented Apr. 14, 1953

2,634,709

UNITED STATES PATENT OFFICE 2,634,709

PRESSURE ACTUATED TRANSMISSION CONTROL UNIT

Robley D. Fageol, Detroit, Mich., assignor to R. D. Fageol Company, Detroit, Mich., a corporation of Michigan Application February 2, 1949, Serial No. 74,050

5 Claims. (Cl. 121—41)

1

This invention relates to remote control units and has particular reference to a remote control power unit which, as illustrated, is arranged for shifting the forward and reverse gears of a marine transmission into and out of gear, although the invention is not limited to the specific application illustrated.

A principal object of the invention is to provide a novel, efficient and improved remote control unit.

Another object of the invention is to provide such a unit in which partial strokes of any desired extent of the control unit may be readily obtained by the operator.

Another object of the invention is to provide such a unit in which the positioning of the manual control is not limited by the piston of the power unit.

Another object of the invention is to provide a novel and efficient remote control for use in connection with a marine transmission and for other applications where work is to be done at a point remote from the operator but under the direct control of the operator.

Other and further objects of the invention will be apparent from the following description and claims and will be understood by reference to the accompanying drawings, of which there are two sheets, which by way of illustration show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 3 is a longitudinal sectional view of the remote control unit;

Fig. 4 is an enlarged view, partly broken away, of the manual control or operator for the control unit;

Fig. 5 is an enlarged sectional view of the valve of the control unit illustrating the parts shown in the oval in Fig. 3; and Fig. 6 is an enlarged sectional view taken along the line 6—6 of Fig. 3.

Figure 1:
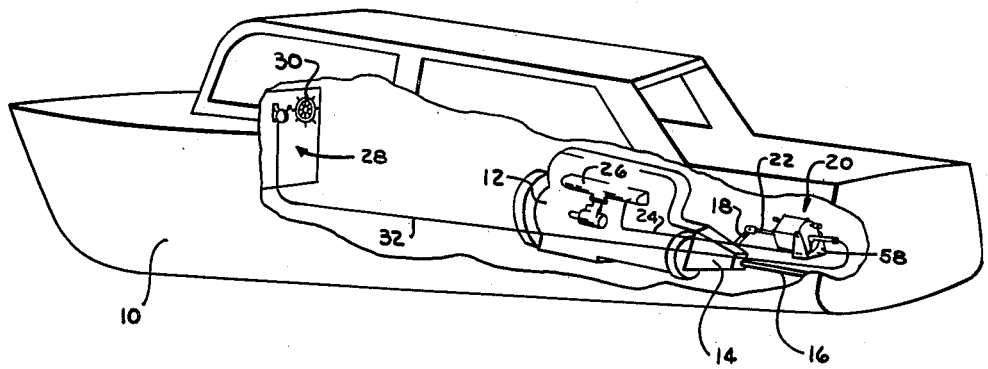
Fig. 1 is a schematic view illustrating the application of a remote control unit embodying the invention to a marine craft for operating the reverse gear thereof.
Figure 2:
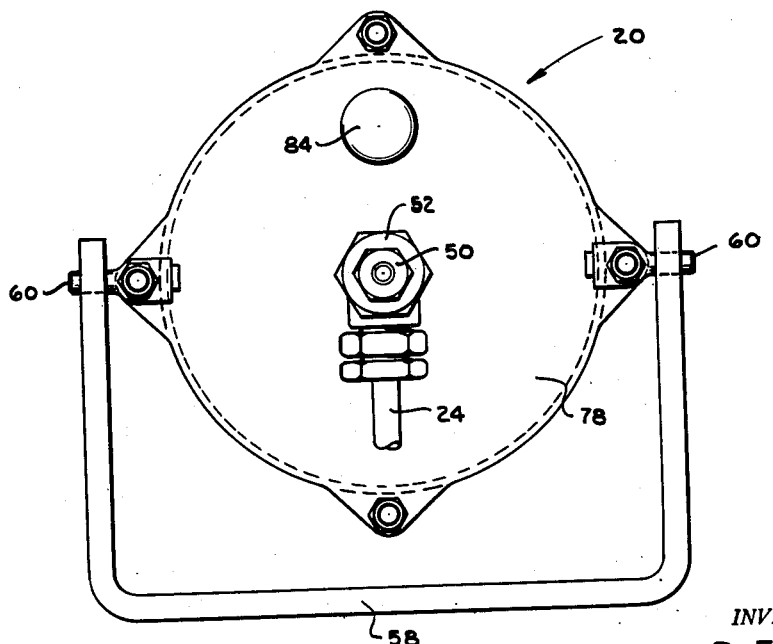
Fig. 2 is an end elevational view of the remote control unit.

In Fig. 1 there is shown one application for a remote control unit embodying the invention, and as there illustrated a boat 10 is provided with an internal combustion engine 12 and a transmission unit 14, such units frequently being designated as reverse gears. A drive or propeller shaft 16 is driven by the engine through the transmission 14 and a propeller is connected to the shaft 16 for propelling the boat. The transmission 14 is provided with a shift lever 18 which may have the usual three positions: namely, forward, neutral and reverse; the shift lever being shown in the reverse position.

In the reverse position of the shift lever 18 the gearing of the transmission is arranged so as to drive the shaft 16 and the propeller secured thereto in a direction to propel the boat reversely. In the neutral position of the shift lever 18 the transmission gearing is arranged so that the shaft 16 and the propeller are not driven in either direction when the engine is going, and in the forward position of the shift lever the transmission gearing is arranged so that the engine will drive the shaft 16 and the propeller in a direction to propel the boat forwardly.

The cylinder and piston unit of the remote control unit is indicated generally at 20, and a thrust or piston rod 22 projects from one end of the unit 20 and is connected to the shift lever 18 for moving the same from one of its positions to the other. A conduit 24 connected to the intake manifold 26 of the internal combustion engine is connected to the piston and cylinder unit 20 so that the suction in the intake manifold during operation of the engine may be employed for actuating the piston and cylinder unit 20.

The remote control unit includes a manual control 28 (Fig. 4) which may be positioned adjacent the steering wheel 30 of the boat, and this control is connected by a motion transmitting connection indicated generally at 32 to the valve of the piston and cylinder unit 20 which controls the operation thereof. The manual control or operator consists of a lever 34 shown in neutral position in Fig. 4 and which is shiftable counterclockwise to the dotted line position indicated at 36, which represents the forward position of the control, and clockwise to the dotted line position 38 which represents the reverse position of the control.

The remote control unit is constructed and arranged so that when the engine 12 is operating, positioning of the control 34 in the neutral position will position the shift lever 18 and the transmission in the neutral position if the transmission is not already in such position. The remote control unit is also adapted to arrange the transmission in its forward position when the control 34 is positioned in the forward position indicated at 36 and to position the transmission in the reverse position when the control 34 is in the position indicated at 38, provided that the engine is operating.

The lever 34 is mounted on a cylindrical member 40 which in turn is rotatably supported in the housing 42, the housing in turn being mounted on a bracket 44 which may be fastened to a suitable panel. The motion transmitting connection includes a flexible motion transmitting cable 46 and a conduit 48 therefor. One end of the conduit 48 is secured to the housing 42 and one end of the cable 46 passes into the housing and around the cylindrical member and is secured thereto for movement therewith in both directions of rotation thereof. The lever 34 is secured to the cylindrical member so as to rotate the same in the housing 42, the housing 42 being provided with a legend F to indicate the forward position for the lever 34, the legend N to indicate the neutral position, and the legend R to indicate the reverse position thereof.

The other end of the conduit 48 is secured by a nut 50 to a coupling member 52 on one end of the piston and cylinder unit 20. One end 54 of the cable projects from the end of the conduit 48 and extends into the piston and cylinder unit 20 where it is connected to one end of a valve member 56. The cable 46 and conduit 48 are similar to a Bowden wire, and when the lever 34 is moved, the end 54 of the cable 46 connected to the control valve 56 will move the control valve member 56 substantially the same amount as the other end of the cable 46 moves in response to movement of the lever 34 so that movements of the control lever 34 will be accurately reflected in corresponding movements of the valve member 56.

The piston and cylinder unit 20 is pivotally mounted in a bracket 58 suitably mounted adjacent the transmission 14, the side arms of the bracket having bearings which receive trunnions 60 provided on the unit 20. In this manner the unit 20 may pivot so that the upper end of the shift lever 18 which swings through an arc during its range of movement will be free to move.

The thrust rod 22 at its forward end is provided with a clevis 62 which is pivoted by bolt 64 to the slotted end 66 of the shift lever 18, the shift lever 18 and the piston and cylinder unit 20 being shown in neutral position in Fig. 3. The shank of the bolt 64 actually passes through a member 68 which is positioned in the slot in the lever 18 and secured therein by the bolt 70 and the clamp 72.

The piston and cylinder unit 20 comprises a cylinder member 82 having end walls 76 and 78 secured thereto by bolts 74, each of the end walls being provided with a restricted orifice or bleed port 80 establishing communication between each end of the cylinder chamber 82 and the atmosphere through filters 84. The piston or thrust rod 22 projects through the wall 76 and has secured thereto a piston member 86. Seal 88 arranged in a recess in the wall 76 around the shaft or rod 22 provides a sliding seal between the wall 76 and the rod 22. The end 54 of the cable 46 is secured by coupling member 90 to the end of the valve member 56 which projects outwardly of the cylinder 82 through the end wall 78 thereof. The member 90 is composed of split parts which are secured together by snap ring 92 and slides in a tubular extension 94 projecting from the wall 78.

A sealing ring, such for example as an O-ring 96, is carried by the coupling member 90 and forms a sliding seal with the interior of the extension 94. The coupling member 52 is threadedly secured to the end of the extension 94, and the engagement of the coupling member 90 with the ends of the extension 94 determines the limit positions of the valve member 56. A seal 98 is arranged in the recess in the wall 78 around valve member 56 and forms a seal therebetween.

The valve member 56 as illustrated comprises a tube or rod which is hollow and which is provided with valve ports 102 and 104. The conduit 24 which is connected with the intake manifold 26 is connected to the extension 94 and communicates with the interior thereof between the seal 98 and the seal 96, and hence the interior of the valve 56 is in communication with the intake manifold through port 104, the interior of extension 94 hereinafter designated as chamber 106, and the conduit 24. The valve tube 56 projects into the cylinder 82 and into the hollow end of the rod 22, such hollow end hereinafter being designated as chamber 108. The left hand end of valve tube 56 is closed off so that chamber 108 communicates with the interior of the tube only through ports 102 when such ports 102 are uncovered in chamber 108. Chamber 108 is in communication with the cylinder 82 on the left-hand side of the piston 86 through ports 110, such chamber on the left-hand side of piston 86 being designated hereinafter as chamber 112, and the chamber on the right-hand side of the piston 86 being designated as chamber 114.

A nut 116 which secures one end of the rod 22 to the piston 86 is formed to provide a valve chamber 118 in which a valve closure member 120 is arranged. The valve closure member 120 comprises an annular plate or member which has a close sliding fit on the valve tube 56 so that when the valve closure member 120 is arranged relative to the valve member 56, as shown in Figs. 3 and 5, the valve ports 102 are closed. The member 120 is secured in the nut 116 by a ring 122 which may be pressed into the opening in the nut 116, and O-ring 124 arranged partially in a groove in the valve closure member 120 seats on an end surface of the valve chamber 118 so as to form a seal between the valve closure member 120 and the nut 116 in order to prevent leakage of fluid between the chamber 114 and the chamber 112. The valve closure member 120 is slidable transversely of the nut 116 so as to facilitate the insertion of the valve tube 56 through the hole in the valve closure member 120.

As previously indicated, the piston 86 is shown in its neutral or intermediate position in Fig. 3. Movement of the valve member 56 to the right by manipulation of the lever 34 will shift the port 102 to the right of the valve closure member 120, thereby uncovering the port and establishing communication between the chamber 114 and the interior of the valve member 56 through the port 102. If the engine is operating, the suction in the intake manifold will thus be applied to the chamber 114 which will cause movement of the piston to the right until the valve closure member 120 again closes the ports 102.

During movement of the piston 86 to the right, the bleed port 80 in the end wall 76 admits air into the chamber 112. The size of the bleed ports 80 is such that they will not nullify the suction affect applied to the piston 86 for moving the same when the ports 102 are uncovered. It will be observed that the valve 56 may be moved to its right-hand limit position, in which event the piston will follow to its right-hand limit position and thence close the ports 102.

The valve member 56 may also be moved to the left from the position illustrated any amount up to and including its limit position, and when this occurs the ports 102 will be exposed to the chamber 108 and through the ports 110 to the chamber 112. This will cause the application of suction to the chamber 112 and hence the movement of the piston to the left.

It will be observed that the valve member 56 is freely shiftable relative to the piston 86 and may be moved from the position illustrated in Fig. 3 to either of its limit positions, or the valve waiting for movement of the piston, or the valve member 56 may be moved from one of its limit positions to the other without waiting for movement of the piston 86. This arrangement which permits the valve 56 to move ahead of the piston makes it possible for the operator of the craft to shift the transmission into and out of forward and reverse very expeditiously when it is desired to maneuver the craft in close quarters, such for example as when docking. The only work that the operator does in shifting the transmission is to shift the lever 34, which requires very little effort because the valve member 56 is merely a control valve and does not apply any of the thrust exerted in movement of the rod 22 in either direction.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. A remote control unit comprising a cylinder member, a piston member arranged in said cylinder member for reciprocal movement relative thereto between limit positions at each end of said cylinder member, a piston rod secured to said piston member and projecting through an end wall of said cylinder member, a hollow valve member reciprocally arranged relative to said piston member and projecting through the opposite end wall of said cylinder member, said hollow valve member forming a fluid flow passage, said passage being provided with a fluid port on the end of the valve member disposed within said cylinder member and said passage having a suction connection thereto exteriorly of said cylinder member, a valve closure member carried by and movable with said piston member relative to said hollow valve member and cooperable with said hollow valve member to close said port therein, said cylinder member having a bleed in communication with each end thereof, said hollow valve member being movable between limit positions spaced a distance at least as great as the stroke of said piston member relative to said cylinder member, means operable for selectively positioning said hollow valve member in either of its limit positions or in any position intermediate its limit positions, positioning of said port of said hollow valve member in any of its positions relative to said valve closure member on one side of said valve closure member uncovering said port and thereby applying suction to said cylinder member on said one side of said piston member whereby said piston member will move relative to said cylinder toward said port until said valve closure member closes said port, said piston member and hollow valve member being constructed and arranged so as to be freely movable relative to each other so as to permit free movement of said hollow valve member by said positioning means from one of its limit positions to the other without thereby moving said piston member.

2. A remote control unit comprising a cylinder member, a piston member reciprocally arranged in said cylinder member and separating the space in said cylinder member on one side of said piston member from the space on the other side thereof, a piston rod secured to said piston member and projecting through an end wall of said cylinder member, a hollow valve member reciprocally arranged relative to said piston rod and projecting through the opposite end wall of said cylinder member, said hollow valve member forming a fluid flow passage, said passage being provided with a fluid port on the end of the valve member disposed within said cylinder member and said passage having a fluid pressure connection thereto exteriorly of said cylinder member, a valve closure member carried by and movable with said piston member relative to said hollow valve member and cooperable with said hollow valve member to close said port therein, said hollow valve member being freely shiftable in both directions relative to said valve closure member so as to uncover said port on either side of said valve closure member and said piston member thereby to establish communication between said cylinder member and said passage on a selected side of said piston member, said cylinder member having a bleed port communicating with each end thereof, said hollow valve member being movable into any position thereof without thereby moving said piston member, said port being adapted to be uncovered so as to establish said communication between said cylinder and said passage throughout the extent of the aforesaid movement of said hollow valve member relative to said valve closure member.

3. A remote control unit comprising a cylinder member, a piston member arranged in said cylinder member for reciprocal movement relative thereto, a piston rod secured to said piston member, a hollow tubular valve member reciprocally arranged relative to said piston member and provided with a radially opening fluid port, a fluid pressure connection with the interior of said valve member, an annular valve closure member through which said hollow valve member extends in sealing relation therewith, said valve closure member being secured to and movable with said piston member relative to said hollow valve member and cooperable with said hollow valve member to close said port therein, said cylinder member having a bleed in communication with one end thereof, means operable for shifting said hollow valve member relative to said valve closure member for positioning said port of said hollow valve member on one side of said valve closure member thereby uncovering said port and causing the application of fluid pressure to said cylinder member on one side of said piston member whereby said piston member will move relative to said cylinder, said hollow valve member being freely movable into either of its limit positions within said cylinder member or into any intermediate position thereof without thereby moving said piston member, said port being uncovered during substantially all movement of said hollow valve member relative to said piston member.

4. A remote control unit comprising a cylinder member, a piston member reciprocally arranged in said cylinder member and separating the space in said cylinder member on one side of said piston member from the space on the other side thereof, a hollow piston rod secured to said piston member and projecting through an end wall of said cylinder member, a hollow valve member reciprocally arranged relative to said piston rod and projecting through the opposite end wall of said cylinder member, said hollow valve member projecting into and being spaced from the inner wall of said hollow piston rod, said hollow valve member forming a fluid flow passage, said passage being provided with a radially opening fluid port on the end of the valve member disposed within said cylinder member and said passage having a suction connection thereto exteriorly of said cylinder member, an annular valve closure member through which said hollow valve member extends so as to provide a sliding seal therewith, said valve closure member being so secured to and movable with said piston member relative to said hollow valve member and cooperable with said hollow valve member to close said port therein, said hollow valve member being shiftable relative to said valve closure member so as to uncover said port on one side of said valve closure member and said piston member thereby to establish communication between said cylinder member and said passage on said side of said piston member, said cylinder member having an atmospheric bleed port communicating with the end thereof on the other side of said piston member, said hollow valve member being movable independently of said valve closure member and said piston member throughout the extent of movement of said hollow valve member relative to said cylinder member.

5. A power unit comprising a chamber having a pressure responsive member extending thereacross, said pressure responsive member being movable in response to differences in pressure on the opposite sides thereof, an annular valve closure member carried by and movable with said pressure responsive member, a reciprocable hollow valve member extending through said valve closure member and slidably arranged relative thereto, means for connecting the interior of said hollow valve member to a source of suction, said hollow valve member having a port therein communicating with the interior thereof, means for shifting said hollow valve member in one direction relative to said valve closure member and said pressure responsive member without thereby moving said valve closure and pressure responsive members so as to position said port on one side of said valve closure member so as to expose one side of said pressure responsive member to suction through said port and said hollow valve member, thereby causing said pressure responsive member to follow the movement of said hollow valve member in said one direction, said one side of said pressure responsive member being exposed to suction through said port and said hollow valve member throughout substantially the entire extent of said movement of said hollow valve member in said one direction, and means for communicating atmosphere to the opposite side of said pressure responsive member, said hollow valve member upon being shifted in the opposite direction positioning said port relative to said valve closure member so as to stop the porting of suction to said one side of said pressure responsive member, thereby permitting said pressure responsive member to be moved in said opposite direction.

ROBLEY D. FAGEOL.

References Cited in the file of this patent

UNITED STATES PATENTS

| Number | Name | Date |
|---|---|---|
| 1,004,541 | Martin | Sept. 26, 1911 |
| 1,679,762 | Bragg | Aug. 7, 1928 |
| 1,958,415 | Bragg | May 15, 1934 |
| 2,053,301 | Russell | Sept. 8, 1936 |
| 2,095,833 | Rockwell | Oct. 12, 1937 |
| 2,107,357 | Wood | Feb. 8, 1938 |
| 2,139,878 | Carlson | Dec. 13, 1938 |
| 2,258,908 | Price | Oct. 14, 1941 |

FOREIGN PATENTS

| Number | Country | Date |
|---|---|---|
| 4,186 | Great Britain | of 1878 |
| 479,946 | Germany | July 27, 1929 |
| 320,435 | Great Britain | Oct. 17, 1929 |